United States Patent

Wallin

[11] Patent Number: 5,937,264
[45] Date of Patent: Aug. 10, 1999

[54] ELECTRODE STRUCTURE FOR SOLID STATE ELECTROCHEMICAL DEVICES

[75] Inventor: Sten A. Wallin, Midland, Mich.

[73] Assignee: The Dow Chemical Company, Midland, Mich.

[21] Appl. No.: 08/921,421

[22] Filed: Aug. 29, 1997

Related U.S. Application Data

[60] Continuation of application No. 08/702,825, Aug. 23, 1996, abandoned, which is a division of application No. 08/559,582, Nov. 16, 1995, Pat. No. 5,670,270.

[51] Int. Cl.$^6$ .................................................. B22F 7/04
[52] U.S. Cl. ........................ 419/2; 419/8; 419/9; 419/19; 419/20; 419/27; 419/38
[58] Field of Search .................... 419/2, 8, 9, 19, 419/20, 27, 38

[56] References Cited

U.S. PATENT DOCUMENTS

| | | | |
|---|---|---|---|
| 4,459,341 | 7/1984 | Marchant et al. | 429/40 |
| 4,686,158 | 8/1987 | Nishi et al. | 429/26 |
| 4,770,955 | 9/1988 | Ruhl | 429/33 |
| 4,789,561 | 12/1988 | Schäefer et al. | 427/126.1 |
| 4,847,173 | 7/1989 | Mitsunaga et al. | 429/44 |
| 4,851,303 | 7/1989 | Madou et al. | 429/13 |
| 4,894,297 | 1/1990 | Singh et al. | 429/31 |
| 4,948,680 | 8/1990 | Madou et al. | 429/13 |
| 5,001,021 | 3/1991 | Maricle et al. | 429/13 |
| 5,057,362 | 10/1991 | Schroeder et al. | 428/312.2 |
| 5,106,706 | 4/1992 | Singh et al. | 429/31 |
| 5,114,803 | 5/1992 | Ishihara et al. | 429/40 |
| 5,122,425 | 6/1992 | Yoshida et al. | 429/44 |
| 5,143,801 | 9/1992 | Bates | 429/40 |
| 5,342,704 | 8/1994 | Vasilow et al. | 429/33 |
| 5,403,461 | 4/1995 | Tuller et al. | 204/252 |
| 5,409,785 | 4/1995 | Nakano | 429/33 |
| 5,432,023 | 7/1995 | Yamada et al. | 429/34 |
| 5,453,330 | 9/1995 | Kawasaki et al. | 429/43 |
| 5,464,654 | 11/1995 | Mizuno | 427/123 |
| 5,543,239 | 8/1996 | Virkar et al. | 429/33 |
| 5,591,537 | 1/1997 | Bagger et al. | 429/33 |
| 5,620,807 | 4/1997 | Mussell et al. | 419/33 |
| 5,629,103 | 5/1997 | Wersing et al. | 429/33 |

FOREIGN PATENT DOCUMENTS

| | | |
|---|---|---|
| 0 275 356 | 7/1988 | European Pat. Off. |
| H3-81959 | 4/1991 | Japan |
| H5-54896 | 3/1993 | Japan |
| H5-325981 | 12/1993 | Japan |
| 2 284 599 | 6/1995 | United Kingdom |

OTHER PUBLICATIONS

Chemical Abstract, 90:129770/17 (1990).
Chemical Abstract, 91:059953 (Mar. 1991).
Chemical Abstract, 91:081959 (Apr. 1991).
Chemical Abstract, 93:029003 (Feb. 1993).
Chemical Abstract, 93:054896 (Mar. 1993).
Chemical Abstract, 93:325981 (Dec. 1993).
Chemical Abstract, 94:071641/09 (1994).
Chemical Abstract, 94:079443/10 (1994).
Chemical Abstract, 94:161192/20 (1994).

(List continued on next page.)

*Primary Examiner*—Daniel J. Jenkins
*Attorney, Agent, or Firm*—Ann K. Galbraith

[57] ABSTRACT

A composite oxygen electrode/electrolyte structure for a solid state electrochemical device having a porous composite electrode in contact with a dense electrolyte membrane, which electrode includes: (a) a porous structure having interpenetrating networks of an ionically-conductive material and an electronically-conductive material; and (b) an electrocatalyst different from the electronically-conductive material, dispersed within the pores of the porous structure. This electrode structure is relatively simple to manufacture, requiring relatively few steps to infiltrate an electrocatalyst precursor material to obtain an electrode structure which will perform advantageously in a solid oxide fuel cell, has a relatively low internal resistance, and permits the selection of an optimal electronically-conductive material and electrocatalyst.

10 Claims, 5 Drawing Sheets

OTHER PUBLICATIONS

Kamata, Hiroyuki et al., 1$^{st}$ European Solid Oxide Fuel Cell Forum, vol. 2, pp. 725–733 (1994).

Minh, Nguyen Q., J. Am. Ceram. Soc., vol. 76, No. 3, pp. 563–588 (1993).

Tedmon, Jr., C. S. et al., J. Electrochemical Society, vol. 116, No. 9, pp. 1170–1175 (1969).

Uchida, Makoto et al., J. Electrochemical Society, vol. 142, No. 2, pp. 463–468 (1995).

Chemical Abstract, 88:206576 (1988) "Solid Electrolyte Fuel Cell".

ELECTRODE STRUCTURE FOR SOLID STATE ELECTROCHEMICAL DEVICES

CROSS-REFERENCE TO RELATED APPLICATIONS

This is a continuation of application Ser. No. 08/702,825 filed Aug. 23, 1996 now abandoned, which is a divisional of application Ser. No. 08/559,582 filed Nov. 16, 1995 now U.S. Pat. No. 5,670,270.

BACKGROUND OF THE INVENTION

This invention relates to solid state electrochemical devices comprised of one or more electrodes in contact with a solid state electrolyte membrane. More specifically, this invention relates to solid state electrochemical devices in which a lower total internal resistance of the cell results in better performance of the device, such as solid oxide or ceramic fuel cell devices or solid oxide or ceramic electrolytic cells.

A solid state electrochemical cell comprises two electrodes, the anode and the cathode, and a dense solid electrolyte membrane which separates the anode and cathode regions of the cell. The anodic and cathodic reactions occur at the anode/electrolyte and cathode/electrolyte interfaces, respectively. The solid electrolyte membrane is a material capable of conducting ionic species, such as oxygen ions, sodium ions, fluoride ions, or hydrogen ions, yet has a low electrical conductivity. The electrolyte membrane must be impermeable to the electrochemical reactants.

It is known to prepare a solid oxide fuel cell comprising a dense electrolyte membrane of a ceramic oxygen ion conductor, a porous anode layer of a ceramic or a metal or, most commonly, a ceramic-metal composite, in contact with the electrolyte membrane on the fuel side of the cell, and a porous cathode layer of an electronically-conductive metal oxide on the oxidant side of the cell, which generates electricity through the electrochemical reaction between a fuel and an oxidant. This net electrochemical reaction involves charge transfer steps that occur at the interface between the ionically-conductive electrolyte membrane, the electronically-conductive electrode and the vapor phase (fuel or oxygen). The contribution of these charge transfer steps, in particular the charge transfer occurring at the oxygen electrode, to the total internal resistance of a solid oxide fuel cell device can be significant, especially if the fuel cell operating temperature is relatively low. Reducing the internal resistance of a solid oxide fuel cell device improves its performance characteristics.

Electrode structures comprising a porous layer of electrolyte particles on a dense electrolyte membrane with electrocatalyst material on and within the porous layer of electrolyte are known. In such electrodes, the electrocatalyst material is continuous on the surface of the porous electrolyte material to create a three phase boundary (TPB) where the electrolyte material, electrocatalyst, and gas are in contact. The electrode is prepared by applying an electrocatalyst precursor material as a slurry to a porous electrolyte structure, and then heating the precursor material to form the electrocatalyst. However, it is usually necessary to repeat the process of applying the electrocatalyst precursor material to the porous substrate several times in order to provide enough electrocatalyst to obtain a fuel cell with the desired performance characteristics. For fuel cell applications, this method of creating the layer of electrocatalyst in and on the porous electrolyte structure by repeated applications of the electrocatalyst slurry may create more process steps in the preparation of the fuel cell than would be desirable in a commercial manufacturing process. In addition, the performance characteristics of the electrode structure prepared by such processes, such as the voltage at a certain current density, may be less than desirable for certain applications.

SUMMARY OF THE INVENTION

In one aspect, this invention is a composite oxygen electrode/electrolyte structure for a solid state electrochemical device having a porous composite electrode in contact with a dense electrolyte membrane, said electrode comprising:

(a) a porous structure having interpenetrating networks of an ionically-conductive material and an electronically-conductive material; and (b) an electrocatalyst different from the electronically-conductive material, dispersed within the pores of the porous structure.

In a second aspect, this invention is a process for preparing a layered composite oxygen electrode/electrolyte structure having a porous composite electrode in contact with a dense electrolyte membrane which comprises the steps of:

(i) contacting a mixture comprising particles of an ionically-conductive material and an electronically-conductive material with a layer comprising an ionically-conductive electrolyte material to form an assembly comprising a layer of the mixture on at least one side of the layer of the electrolyte material;

(ii) sintering the assembly; and (iii) infiltrating the assembly with a solution or dispersion of an electrocatalyst precursor.

It has been discovered that the electrode structure and process of the invention provide an oxygen electrode/electrolyte assembly which is relatively simple to manufacture, requiring relatively few steps to infiltrate an electrocatalyst precursor material to obtain an electrode structure which will perform advantageously in a solid oxide fuel cell, has a relatively low internal resistance, and which permits the selection of an optimal electronically-conductive material and electrocatalyst. The invention also provides an electrode/electrolyte structure with an advantageous three phase boundary (TPB) length between the electrocatalyst, the ionically-conductive material in contact with the electrocatalyst, and the gas phase. When utilized as the cathode and electrolyte membrane of a solid oxide fuel cell, such fuel cells have advantageous power densities at relatively low operating temperatures, such as about 700–800° C. These and other advantages of the invention will be apparent from the description which follows.

DETAILED DESCRIPTION OF THE INVENTION

Figure 1:
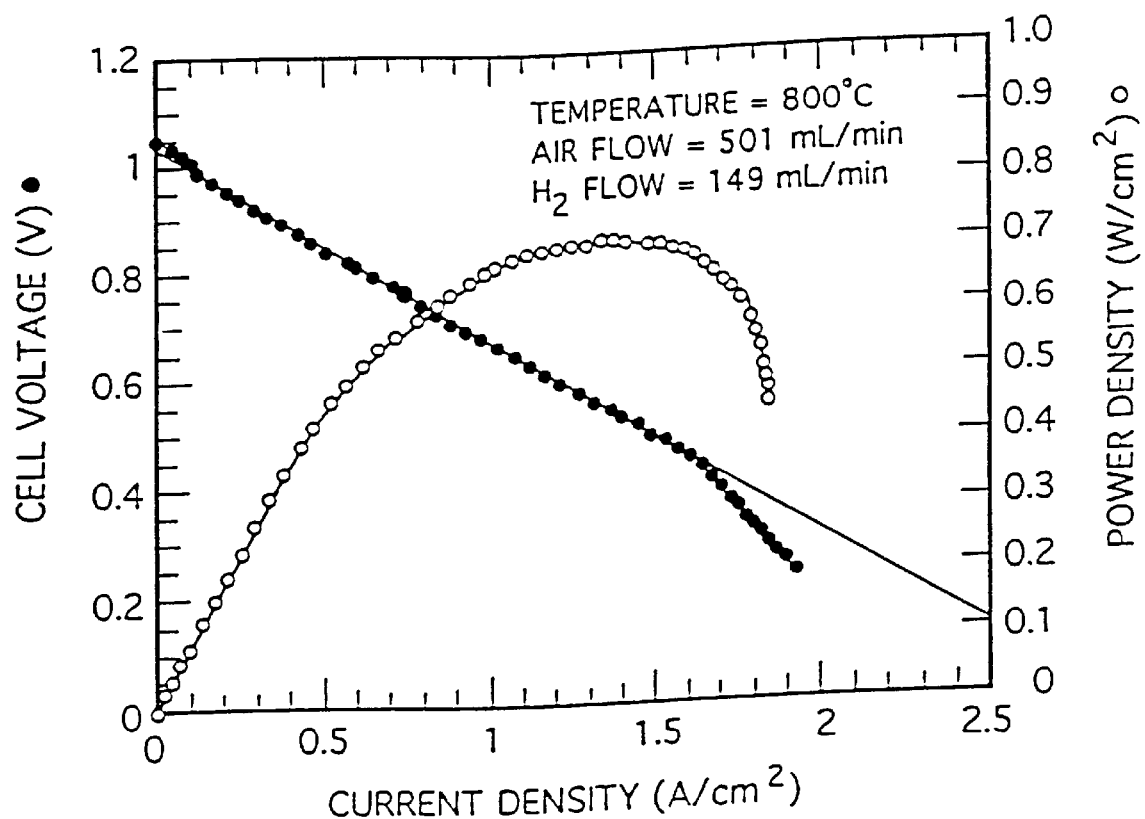
FIGS. 1–5 illustrate the performance of anode/electrolyte/cathode structures prepared and tested in accordance with the procedures described in Examples 1–5, respectively.

The term "oxygen electrode" as used herein refers to the electrode at which oxygen is either reduced, or oxygen anions are oxidized, depending on the function of the cell, such as the cathode portion of a solid oxide fuel cell or the anode portion of an electrolytic cell. The oxygen electrode portion of the electrode/electrolyte structure of the invention comprises a porous, solid-solid mixture of ionically-conductive material and electronically-conductive material, having an electrocatalyst different from the electronically-conductive material dispersed within its pores. The mixture comprises a continuous phase of the ionically-conductive material and a continuous phase of the electronically-conductive material, which form interpenetrating networks with respect to each other.

The electrode/electrolyte structure of the invention may be prepared by any suitable method. For example, the unsintered mixture of electronically-conductive and ionically-conductive materials may be deposited on a layer comprising a sintered or unsintered ionically-conductive electrolyte material prior to being sintered, to ensure sufficient contact between the layers, as illustrated in the process of the second aspect of the invention. In one embodiment of such a process, the mixture of ionically-conductive and electronically-conductive materials is deposited on an unsintered layer of electrolyte material and the mixture and electrolyte layer are sintered simultaneously. In another embodiment, the mixture is deposited on a previously sintered layer of electrolyte, and then sintered.

The mixture of ionically-conductive and electronically-conductive particles may be applied to the layer comprising particles of an electrolyte material (hereafter "electrolyte layer"), by any suitable means such as, for example, tape casting methods, painting or silk-screening a slurry of the material(s) onto the electrolyte layer, or by vapor deposition techniques such as plasma-spraying directly onto the solid electrolyte structure. When sintered, the ionically-conductive and electronically-conductive materials form interpentrating networks comprised of fused grains of ionically-conductive material or electronically-conductive material, respectively. After the mixture is sintered to the electrolyte layer, an electrocatalyst is incorporated into the porous network of electronically-conductive particles and ionically-conductive particles by any suitable technique, such as by infiltrating the network with a solution or dispersion of an electrocatalyst precursor and heating the infiltrated network under conditions sufficient to form the corresponding electrocatalyst.

The term "electronically-conductive material" as used herein means a material having an electronic conductivity of at least about $10^{-1}$ Siemens/cm (S/cm) at the operating temperature of the device. Preferably, the conductivity of the material is at least about 10 S/cm, more preferably at least about 100 S/cm. This phase must also be compatible with the electrolyte layer and the ionically-conductive material of the composite electrode. For example, it must not significantly undergo reactions with either the layer or the material at the processing or operating temperatures to form a new phase with insufficient conductivity or electrocatalytic properties for use in a practical device. The primary function of the electronically-conductive material is the transport of electricity (electrons) either from the external circuit to the active sites of the electrode or from the active sites to the external circuit, although the electronically-conductive phase may also have a significant ionic conductivity and may also be a good electrocatalyst.

The term "electrocatalyst" as used herein refers to a material with sufficient catalytic activity for the electrochemical reaction(s) occurring at the electrode for its use in a practical device. This material must also be compatible with the electrolyte layer, the ionically-conductive material and the electronically-conductive material, at the operating temperature of the device. The primary function of this material is to efficiently promote the desired electrochemical reaction(s) within the electrode.

Suitable electronically-conductive materials and electrocatalysts include metallic or semi-conductive materials such as metals, conductive metal alloys, conductive metal oxides, and mixtures thereof. Examples of suitable metals include platinum, silver, palladium, rhodium, iridium and ruthenium. Examples of suitable conductive metal alloys include conductive metal oxides such as the rare earth perovskites having the general formula: $A_{1-a}A'_aB_{1-b}B'_bO_{3-\delta}$, where $0 \leq a \leq 1$; $0 \leq b \leq 1$; $-0.2 \leq \delta \leq 0.5$; A is at least one rare earth cation such as La, Pr, Nd, Sm or Tb; A' is at least one dopant cation, such as the alkaline earth cations Sr or Ca; B is at least one transition element cation selected from the group consisting of Mn, Co, Fe, Cr, or Ni; and B' is a transition element cation different from B. Examples of such conductive rare earth perovskites include $La_{1-a}Sr_aMnO_{3-\delta}$ ("LSM"), where $0 \leq a \leq 0.5$; $Pr_{1-a}Sr_aMnO_{3-\delta}$ ("PSM"), where $0 \leq a \leq 0.6$; $Pr_{1-a}Sr_aCoO_{3-\delta}$, where $0 \leq a \leq 0.5$; $La_{1-a}Sr_aCo_{1-b}Fe_bO_{3-\delta}$, where $0 \leq a \leq 0.4$ and $0 \leq b \leq 0.8$; $La_{1-a}Sr_aCo_{1-b}Ni_bO_{3-\delta}$, where $0 \leq a \leq 0.6$ and $0 \leq b \leq 0.4$ and $La_{1-a}Sr_aCrO_{3-\delta}$ or $La_{1-a}Ca_aCrO_{3-\delta}$ where $0 \leq a \leq 0.5$. Examples of other conductive metal oxides include the products formed from mixtures of $In_2O_3$—$PrO_{1.83}$—$ZrO_2$, having composition ratios of $In_2O_3$ of 0 to 90%, $PrO_{1.83}$ of 10 to 100%, $ZrO_2$ of 0 to 50% and the products formed from mixtures of $CO_3O_4$—$PrO_{1.83}$—$ZrO_2$, having composition ratios of $Co_3O_4$ of 0 to 70%, $PrO_{1.83}$ of 30 to 100% and $ZrO_2$ of 0 to 50%. Other conductive or semi-conductive materials having a conductivity of at least 0.1 S/cm at the cell operating temperature may also be useful. Preferably, the electronically-conductive material is rare earth manganite such as PSM or LSM, particularly when the electrolyte material is a doped zirconia.

The term "ionically-conductive material" as used herein means a material with sufficient ionic conductivity for its use in a practical fuel cell device (typically $\sigma_i \geq 10^{-3}$ S/cm at the operating temperature of the device). This material must also be compatible with the ionically-conductive and electronically-conductive materials to which it is adjacent in the electrolyte/electrode structure. For example, it must not significantly undergo reactions with either of those materials at the processing or operating temperatures to form a new phase with insufficient conductivity or electrocatalytic properties for use in a fuel cell. The primary function of the ionically-conductive material in the electrode is the efficient transport of ions from the active sites of the electrode to the electrolyte membrane, and vice versa, depending on whether the device in which the electrode is utilized is a fuel cell or eletrolytic cell. However, the ionically-conductive material may also have a significant electronic conductivity and may also be a good electrocatalyst.

Suitable ionically-conductive materials include doped zirconias such as yttria-stabilized zirconia ("YSZ"), ytterbium-stabilized zirconia ("YbSZ"), scandium-doped zirconia, ceria, gadolinium-doped ceria, $Gd_{0.19}Pr_{0.01}Ce_{0.8}O_{2-y}$ (y varying with the oxidation states of the Gd and Pr), strontium-doped $BaCeO_3$, rare earth- or alkaline earth-doped $LaAGaO_3$, calcium-doped $Gd_2Ti_2O_7$, reaction products of mixtures of $PrCoO_3$-YSZ having the composition ratios of $PrCoO_3$ of 0 to 70%, YSZ of 30 to 100% and mixtures thereof. Preferably, the ionically-conductive material is a doped zirconia, and is most preferably YSZ.

The electronically- and ionically-conductive materials are employed in amounts sufficient to form conductive networks among like particles after sintering, but are preferably present in an amount, based on the solid volume of the materials used to prepare the porous layer, of at least about 20 percent by volume of each and preferably no more than about 80 percent by volume of either. The size of the particles of ionically-conductive and electronically-conductive materials, as well as the size of the grains of materials present after sintering (as may be observed by Scanning Electron Microscopy) is preferably in the range of from about 0.1–20 microns. The mixture used to prepare the porous interpenetrating network may optionally contain a fugitive binder such as an organic polymer, and/or a fugitive pore former such as carbon particles, which will burn at or below the sintering temperature to increase the porosity of the structure. Examples of suitable fugitive binders include acrylates, poly(vinyl butyral) (available from Monsanto as Butvar™), polyvinyl acetone, methylcellulose, and styrene/butadiene copolymers.

The term "electrolyte membrane" as used herein refers to an ionically-conductive solid membrane having an ionic conductivity ($\sigma_i$) of at least about $10^{-3}$ S/cm at the operating temperature of the device and sufficiently low electronic conductivity ($\sigma_e$) for its use as the electrolyte membrane which separates the anode from the cathode in a solid state electrochemical device. Preferably, $\sigma_e/\sigma_i \leq 10^{-2}$, and more preferably $\sigma_e/\sigma_i \leq 10^{-3}$. Preferably, the area-specific resistance of the membrane is less than about 0.1 $\Omega \cdot cm^2$, which may be calculated by dividing its thickness by its conductivity, $\sigma$. The electrolyte membrane may be prepared by any suitable method, such as by depositing a slurry of an ionically-conductive electrolyte material directly onto one of the electrodes, or by preparing a cast tape of an ionically-conductive electrolyte material, which is laminated to a cast tape of electrode material. In the most preferred embodiment, the ionically-conductive electrolyte material is deposited onto a layer of unsintered material, which, after sintering, will become the electrode on the opposite side of the electrolyte membrane with respect to the electrode prepared by the process of the invention. Either or both the anode or cathode side of a cathode/electrolyte membrane/anode structure may be the electrode of the invention or prepared by the process of the invention.

The assembly is then sintered under suitable pressure and temperature conditions. The sintering conditions should be selected so that they are sufficient to fuse the majority of the like particles in the assembly layer containing the ionically-conductive and electronically-conductive particles, as well as to fuse the majority of like particles at the electrolyte membrane/electrode interface sufficiently to form an ionically-conductive pathway therebetween. If the layer of ionically-conductive material has not been previously sintered, the sintering conditions should be selected to densify the ionically-conductive material sufficiently to form a gas-impermeable electrolyte membrane. Fugitive pore-forming materials which will burn at or below the sintering temperature may also be incorporated into the mixture to control the porosity of the electrode layer, as discussed above. The sintering conditions necessary to form the structure having an optimum porosity (as far as the performance of the fuel cell or electrolytic cell is concerned) may be readily determined experimentally.

In the preparation of the electrode/electrolyte structure of the invention, after the mixture of ionically-conductive and electronically-conductive materials has been sintered, the porous structure or assembly formed from the mixture of the electronically-conductive material and the ionically-conductive material is then infiltrated with a solution or dispersion of an electrocatalyst precursor material. Preferably, a solution of a precursor material is utilized. Any electrocatalyst that can be formed by heat treating a solution precursor or the residue of evaporation of a solution precursor can be utilized in the porous electrode structure by infiltrating the electrode with the solution precursor, and then heating the electrode/electrolyte assembly. Preferably, the electrocatalyst is $PrCoO_3$ or $PrCoO_3$/silver, the reaction products formed from mixtures of $PrCoO_3$-YSZ with composition ratios of $PrCoO_3$ of 30 to 100%, YSZ of 0 to 70%, La(Sr)CoO$_3$, or La(Sr)Co(Ni)O$_3$. If the ionically-conductive material is YSZ or YbSZ, the electrocatalyst is preferably $PrCoO_3$. If the ion-conducting material is ceria or a doped ceria, the electrocatalyst is preferably La(Sr)CoO$_3$, La(Sr)Co(Ni)O$_3$, or La(Sr)Fe(Co)O$_3$.

Solution precursors of electrocatalysts include aqueous or non-aqueous solutions of metal salts recited above, such as nitrates, acetates and citrates. Furthermore, any electrocatalyst that can be formed by deposition from or decomposition of a gas phase precursor can also be introduced within the porous electrode structure by infiltrating the electrode with said gas phase precursor. For example, $La_{1-x}Sr_xMnO_3$ may be formed within the porous structure by heating the structure after it has been infiltrated with a solution containing a mixture of 1–x molar equivalents of lanthanum nitrate, x molar equivalents of strontium nitrate, and 1 molar equivalent of manganese nitrate.

The porous structure may be infiltrated by any suitable means such as by painting or silk screening the solution of the electrocatalyst material into the porous structure. If desired, a stack of cells may be assembled prior to being infiltrated and infiltrated simultaneously. If precursor materials are used, the step of heating the material to form the electrocatalyst is preferably carried out when the fuel cell is heated to its operating temperature. The step of heating the electrocatalyst precursor to form the electrocatalyst may be carried out on the assembly after infiltration, or after the assembly has been used in the preparation of a multi-cell stack.

The materials used to prepare the electronically- and ionically-conductive phases of the composite electrode are preferably chosen to be compatible with the electrolyte membrane, so that reactions significantly deleterious to the performance of the cell do not occur at sintering or cell operating conditions. However, the catalytic properties of the optimum electronically-conductive materials may be less than desirable. Since the electrocatalyst precursor is infiltrated after the porous network layer and electrolyte layer are sintered, it need only be compatible with the network and electrolyte layer at temperatures at which the precursor material is heated, or the fuel cell is operated, which are typically much lower than the temperature at which the electrode will have previously been sintered. The electronically-conductive material preferably has electronic conductivity, chemical compatibility with the electrolyte membrane at the sintering, and fuel cell operating temperatures, both in terms of chemical reactivity and coefficients of thermal expansion.

The porosity of the composite electrode structure containing the electrocatalyst is preferably at least about 10 percent, more preferably at least about 20 percent; but is preferably no greater than about 50 percent, more preferably no greater than about 35 percent. The average pore size of the composite structure is preferably at least about 0.1 micron, more preferably at least about 1 micron; but is preferably no greater than about 20 microns, more preferably no greater than about 10 microns. If the structure is heated to form the correct form of electrocatalyst, it is preferably heated at a temperature below the sintering temperature of the materials and the porous layer so that the particles do not further coarsen. The thickness of the sintered electrolyte membrane is preferably at least about 5 $\mu m$, more preferably at least about 10 $\mu m$; but is preferably no greater than about 35 µm, more preferably no greater than about 20 µm. The thickness of the sintered composite electrode is preferably at least about 5 µm, more preferably at least about 50 µm; but is preferably no greater than about 500 µm, more preferably no greater than about 200 µm.

Solid oxide fuel cells which incorporate the electrode of the invention preferably have a peak power density of at least about 0.3 watt/cm$^2$ operating at 800° C. using hydrogen gas as a fuel and air as an oxidant.

ILLUSTRATIVE EMBODIMENTS

The following examples are given to illustrate the invention and should not be interpreted as limiting it in any way. Unless stated otherwise, all parts and percentages are given by weight.

Example 1

The anode portion of an anode/electrolyte/cathode structure is formed by pressing a 1.25" dia. disk from 2.5 g of a mixture of NiO(62 wt %)/YSZ(38 wt %). The mixture of NiO/YSZ is prepared by ball milling 31.0 g of NiO (available from Johnson Matthey, Ward Hill, Mass.), 19.0 g of YSZ (Tosoh TZ-8Y (available from Tosoh Ceramics, Boundbrook, N.J.) and 1.45 g of a styrene/butadiene latex binder in 65 mL of ethanol and 10 mL of water for 1.5 days. A thin coating of YSZ (the ionically-conductive electrolyte material) is applied to one face of the NiO/YSZ disk by placing 7 to 8 drops of a dispersion of YSZ in absolute ethanol on the face of the disk and quickly tilting the disk in a circular fashion to completely and as uniformly as possible cover the face of the disk. The dispersion is prepared by sonicating a suspension of 0.5 g of YSZ in 20 mL of absolute ethanol for about 4 minutes. The coated disk is allowed to dry for 50 minutes under a glass cover dish. The coating procedure is repeated three more times for a total of four applications (this typically yields a sintered YSZ electrolyte membrane about 15 µm thick).

A coating of a mixture of YSZ (ion-conductive material), LSM (electronically-conductive material), and graphite (fugitive pore-forming material) is applied to the face of the disk which was previously coated with YSZ. The YSZ/LSM/graphite mixture is prepared by sonicating for 4 minutes a suspension of 1.8 g YSZ (Tosoh TZ-8Y), 1.4 g LSM (La$_{0.8}$Sr$_{0.2}$MnO$_3$, Seattle Specialty Ceramics, Seattle, Wash.) and 1.5 g of graphite (325 mesh size, available from Johnson Matthey) in 22 mL of absolute ethanol. After drying for about 2 hours, the disk is fired to burn out the fugitive pore formers and binder and sinter the structure, according to the following schedule: heat room temperature to 300° C. in 1:10 (1 hour 10 minutes), 300 to 750° C. in 5:00, 750 to 800° C. in 1:30, 800 to 1200° C. in 2:30, 1200 to 1225° C. in 3:00, cool 1225 to 1000° C. in 2:00, 1000 to 500° C. in 2:30, then furnace cool from 500° C. to room temperature (RT). After firing, the disk is about 1.0" dia. and is slightly warped. The disk is creep flattened by flat firing under the weight of a setter for 3 hours at 1250° C.

After cooling, the porous LSM/YSZ layer is infiltrated with an aqueous solution of 1 M praseodymium nitrate and 1 M cobalt nitrate by applying the solution with a brush until the porous LSM/YSZ layer has fully absorbed the solution. After drying at room temperature for about 1 hour, the disk is fired at 900° C. for 1 hour (the electrocatalyst precursor). After cooling, a second coating of Pt ink is applied to the anode face, a second infiltration of the cathode layer is performed, this time with an aqueous solution containing 1 M praseodymium nitrate, 1 M cobalt nitrate, and 1 M silver nitrate. After drying at about 110° C. for 1 hour, Pt ink is painted on the cathode face and silver mesh is attached to both the anode and cathode faces of the fuel cell, to function as current collectors. The cell assembly is then fired for 2 hours at 875° C. The Pt ink and the silver mesh serve as current collectors for the cell testing apparatus.

The current-voltage response of the fuel cell is measured at 800° C. using humidified hydrogen (about 3% water) as the fuel gas and air as the oxidant gas. The air flow across the cathode is maintained at about 500 mL/minute and the fuel flow across the anode maintained at about 150 mL/minute. The current-voltage data shown in FIG. 1 is collected with a Hewlett-Packard DC Electronic Load in constant voltage mode after the cell has been operating for about 22.5 hours under a load of about 0.6 ohm ($V_{cell}$=0.795 V, $I_{cell}$~1.3 A). A cell area of 2.34 cm$^2$ (the area of a disk 0.68" dia.) is used to calculate the cell current density and power density shown in FIG. 1. The slope of the plot of cell voltage vs. current density is the area specific resistance of the cell (0.35 ohm-cm$^2$ from FIG. 1).

Example 2

Figure 2:
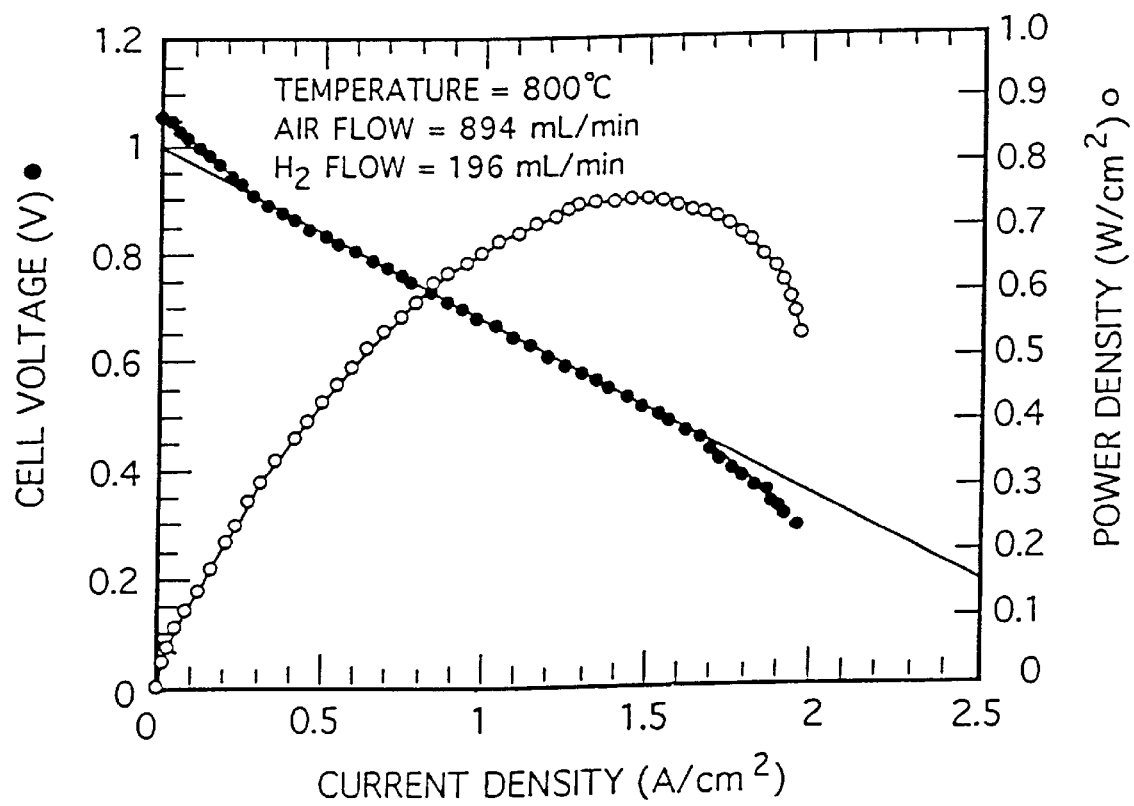

An anode/electrolyte/cathode structure is prepared as described in Example 1, except that the cell is heated to 800° C. for 12 hours, and cooled again to ambient temperatures prior to being infiltrated a single time with the catalyst precursor to PrCoO$_3$. The cell is then tested in accordance with the procedure described in Example 1, and the cell's current-voltage data is shown in FIG. 2.

Example 3

A 1.25" dia. disk is pressed from 2.5 g of a mixture containing 62 wt % of NiO (Alfa), 26 wt % of YSZ (Tosoh TZ-8Y), and 12 wt % of YbSZ (8 mol % Yb-doped ZrO$_2$, Seattle Specialty Chemicals). A thin coating of YbSz is applied to one face of the NiO/YSZ/YbSZ disk by placing 6 to 8 drops of a dispersion of 8 mol % Yb-doped ZrO$_2$ in absolute ethanol on the face of the disk and quickly tilting the disk in a circular fashion to completely and as uniformly as possible cover the face of the disk. The coated disk is allowed to dry for 50 minutes under a glass cover dish. The coating procedure is repeated 4 more times for a total of 5 applications. Next, a coating of a mixture of YbSZ, LSM, and graphite is applied to the face of the disk previously coated with YbSZ by applying a slurry containing 38 wt % YbSZ, 30 wt % LSM (La$_{0.8}$Sr$_{0.2}$MnO$_3$, Seattle Specialty Ceramics) and 32 wt % graphite powder (available from Johnson Matthey) in absolute ethanol. After drying, the disk is fired according to the following schedule: heat from room temperature to 300° C. in 1:10, 300 to 750° C. in 5:00, 750 850° C. in 1:30, 850 to 1225° C. in 3:00, 1225 to 1250° C. in 3:00, 1250 to 1000° C. in 2:00, 1000 to 500° C. in 1:30, 500° C. to room temperature in 0:50. After firing, the fuel cell is creep flattened under the weight of a setter for 3:00 at 1250° C.

Figure 3:
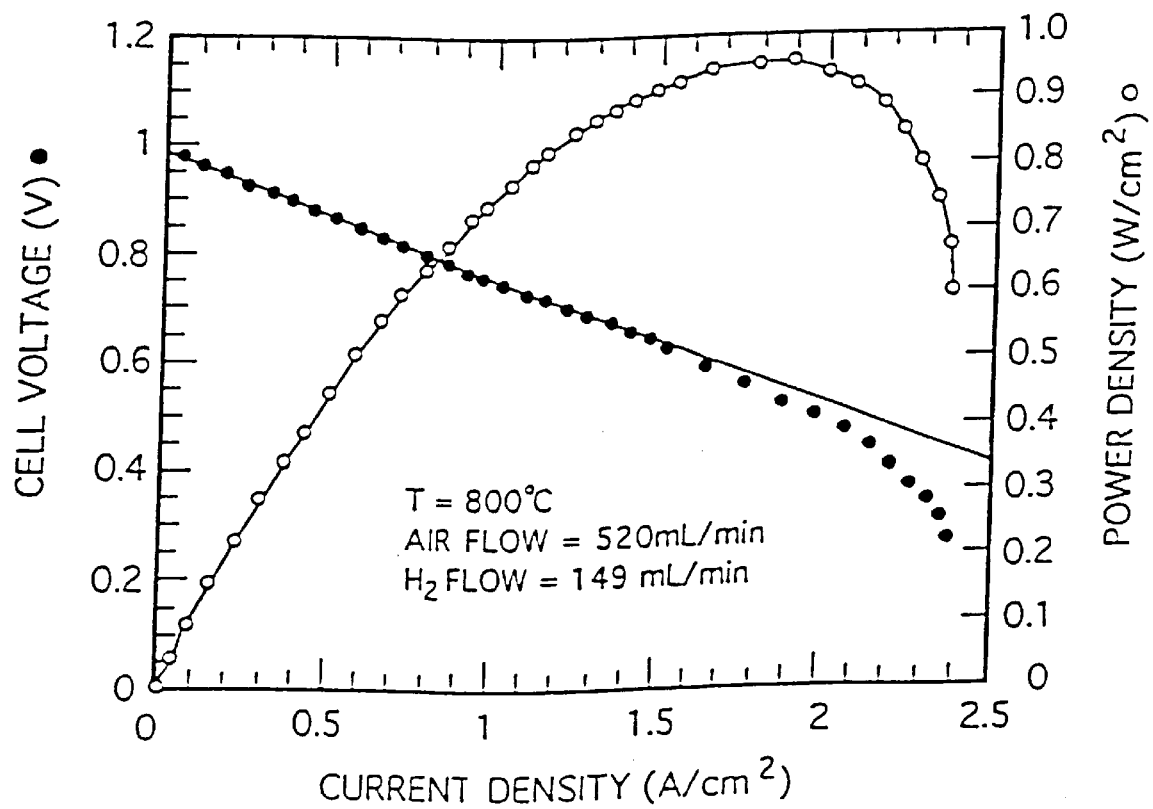

The YbSZ/LSM cathode of the fuel cell is then infiltrated with a 1 M solution of Pr and Co nitrates in water and heat treated for 1 hour at 900° C. The infiltration/heat treatment procedure is repeated twice. After applying the platinum ink/silver mesh current collectors, the cell performance is measured at 800° C. using humidified hydrogen as the fuel gas and air as the oxidant gas. The air flow across the cathode is is maintained at about 520 mL/minute and the fuel flow across the anode maintained at about 150 mL/minute. The current-voltage response of the fuel cell is shown in FIG. 3. The cell produces a peak power of 0.95 W/cm$^2$. The slope of the plot of cell voltage vs. current density gives a value for the area specific resistance (ASR) of the cell of ASR=0.24 Ω-cm$^2$.

Example 4

Anode/electrolyte/cathode tapes of YSZ (Tosoh TZ-8Y), NiO/YSZ (NiO/YSZ=50/50 by weight), and LSM/YSZ/graphite (LSM/YSZ/C=100/30/20 by weight) are cast on a batch caster. The tape casting slips employ a 50/50 mixture of methyl ethyl ketone/ethanol as the solvent, polyvinyl butyral (Monsanto) as the binder and dibutyl phthalate (Aldrich) as the plasticizer. The YSZ electrolyte layer tape is cast with a thickness of 0.002", the NiO/YSZ anode layer tape is cast with a thickness of 0.010", and the LSZ/YSZ/graphite cathode layer tape is cast with a thickness of 0.010". A layered structure consisting of LSM/YSZ/graphite cathode; (1 layer)/YSZ electrolyte; (1 layer)/NiO/YSZ/anode; (5 layers) is produced by laminating the tapes at 70° C., 2 ksi isostatic pressure for 10 minutes using an isostatic laminator. The layered structure is then cosintered according to the following schedule: 5° C./minute from RT to 300° C.; 2° C./minute from 300 to 900° C.; hold at 900° C. for 1 hour; 2.5° C./minute from 900° C. to 1250° C.; hold at 1250° C. for 3 hours; cool to RT at 5° C./minute.

Figure 4:
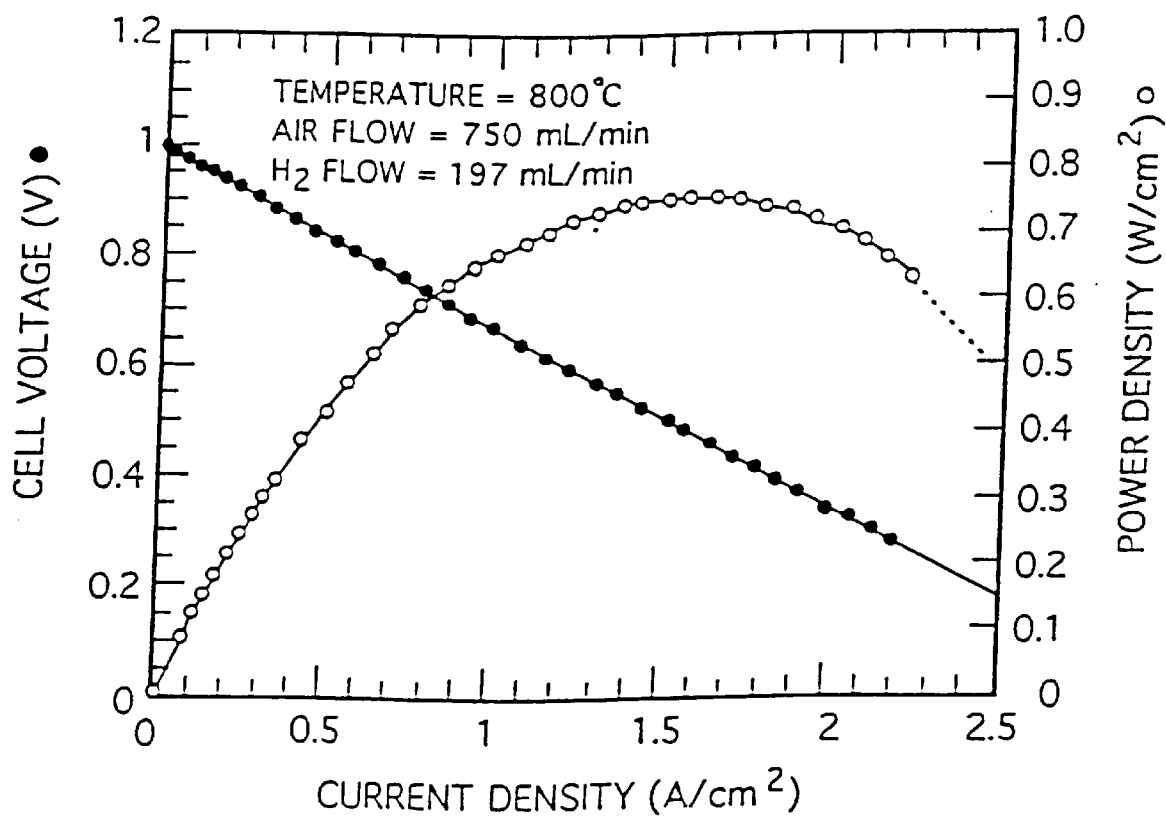

The YSZ/LSM cathode of the fuel cell is infiltrated once with a 1 M solution of Pr and Co nitrates (electrocatalyst precursor) in water and heat treated for 1 hour at 900° C. After applying the platinum ink/silver mesh current collectors, the cell performance is measured at 800° C. using humidified hydrogen as the fuel gas and air as the oxidant gas. The air flow across the cathode is maintained at about 750 mL/minute and the fuel flow across the anode maintained at about 200 mL/minute. The current-voltage response of the fuel cell is shown in FIG. 4. The cell produces a peak power of 0.74 W/cm$^2$. The slope of the plot of cell voltage vs. current density gives a value for the area specific resistance of the cell of 0.33 Ω-cm$^2$.

Example 5

A 1.25" dia. disk is pressed from 2.5 g of a mixture containing 62 wt % of NiO (Alfa), 26 wt % of YSZ (Tosoh TZ-8Y), and 12 wt % YbSZ (8 mol % Yb-doped $ZrO_2$, Seattle Specialty Ceramics). This mixture is prepared by the same method described in Example 3 except no latex binder is employed. A thin coating of YSZ is applied to one face of the NiO/YSZ/YbSZ disk by placing 6 to 8 drops of a dispersion of YSZ (Tosoh TZ-8Y) in absolute ethanol on the face of the disk and quickly tilting the disk in a circular fashion to completely and as uniformly as possible cover the face of the disk. The dispersion is prepared by sonicating 0.497 g of YSZ in 20 mL of absolute ethanol for 2 minutes at 100 W. The coating procedure is repeated two more times for a total of three applications. Next, two coatings of YbSZ are applied on top of the YSZ layer in the same manner. The YbSZ dispersion is prepared by sonicating 0.506 g of 8 mol % Yb-doped $ZrO_2$ (Seattle Specialty Ceramics) in 20 mL of absolute ethanol for 4 minutes at 100 W. Finally, a coating of YbSZ/graphite is applied to the face of the disk previously coated with YbSZ by applying a slurry containing 38 wt % YbSZ, 30 wt % LSM, and 32 wt % graphite powder (Alfa, −325 mesh) in absolute ethanol.

After drying, the disk is fired according to the following schedule: heat from room temperature to 300° C. in 1:10, 300 to 750° C. in 5:00, 750 to 850° C. in 1:30, 850 to 1225° C. in 3:00, 1225 to 1250° C. in 3:00, 1250 to 1000° C. in 2:00, 1000 to 500° C. in 1:30, 500° C. to room temperature in 0:50. After sintering, the fuel cell is creep flattened under the weight of a setter according to the following firing schedule: heat from room temperature to 300° C. in 1:10, 300 to 750° C. in 5:00, 750 to 800° C. in 1:30, 800 to 1225° C. in 3:00, 1250 to 1250° C. in 3:00, cool 1250 to 1000° C. in 2:00 and 1000 to 500° C. in 1:30, then furnace cool from 500° C. to room temperature. After sintering, the cells are about 1.0" dia. and are slightly warped. The warp is removed by creep flattening the cells under the weight of a setter for 3 hours at 1250° C.

Figure 5:
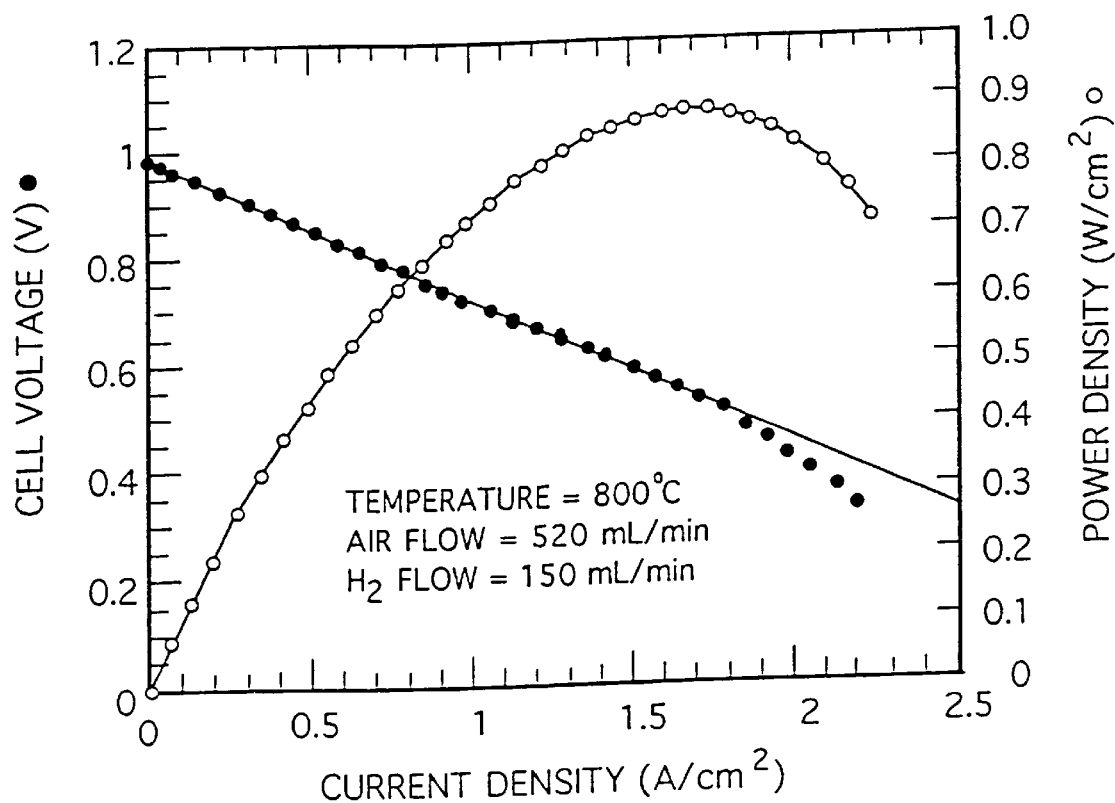

The LSM/YbSZ layer is infiltrated once with the 1 M $PrCoO_3$-silver precursor and the anode and cathode faces are painted with Pt ink. The cell is then fired at 900° C. for 1 hour. After cooling, the infiltration is repeated and the anode and cathode faces again painted with Pt ink and fired for 1 hour at 900° C. Another coating of Pt ink is applied to the cathode face and the cell fired a third time for 1 hour at 900° C. Finally, another application of Pt ink is made to the anode and cathode faces, and the cell sandwiched between silver mesh and fired at 900° C. for 1 hour under the weight of two setters. Mica sheets are placed between the cell assembly and the setters to prevent the cell from sticking to the setters. Any mica stuck to the cell after firing is removed with light sanding. The cell is placed in a test stand and tested under the conditions noted in FIG. 5. The current-voltage response of the fuel cell is shown in FIG. 5.

What is claimed is:

1. A process for preparing a layered composite oxygen electrode/electrolyte structure having a porous composite electrode in contact with a dense electrolyte membrane which comprises the steps of:
   (i) contacting a mixture comprising particles of an ionically-conductive material and an electronically-conductive material with a layer comprising an ionically-conductive electrolyte material to form an assembly comprising a layer of the mixture on at least one side of the layer of the electrolyte material;
   (ii) sintering the assembly; and
   (iii) infiltrating the assembly with a solution or dispersion of an electrocatalyst precursor.

2. The process of claim 1 wherein the ionically-conductive material comprises YSZ, and the electronically-conductive material is LSM, PSM, or mixtures thereof.

3. The process of claim 1 wherein the ionically-conductive material comprises YbSZ, and the electronically-conductive material is LSM, PSM, or mixtures thereof.

4. The process of claim 1 wherein the ionically-conductive material comprises ceria or doped ceria, and the electronically-conductive material is LSM, PSM, or mixture thereof.

5. The process of claim 1 wherein the electrocatalyst comprises $PrCoO_3$.

6. The process of claim 1 wherein the electrolyte layer utilized in step (i) has not been previously sintered.

7. The process of claim 6 wherein the electrolyte membrane comprises YSZ and has a thickness of at least about 0.5 μm and no greater than about 30 μm and the electrode has a thickness of at least about 10 μm and no greater than about 200 μm.

8. The process of claim 7 wherein the ionically-conductive material comprises YbSZ, and the electronically-conductive material is LSM, PSM, or mixtures thereof.

9. The process of claim 6 wherein the electrolyte membrane comprises YbSZ and has a thickness of at least about 0.5 μm and no greater than about 30 μm and the electrode has a thickness of at least about 10 μm and no greater than about 200 μm.

10. The process of claim 1 wherein the electrolyte layer utilized in step (i) has been previously sintered.

* * * * *